(12) United States Patent
Robertson

(10) Patent No.: US 10,697,777 B1
(45) Date of Patent: Jun. 30, 2020

(54) SYSTEM AND METHOD FOR A BUOY DRONE AND PLACEMENT

(71) Applicant: Peyton Webb Robertson, Fort Lauderdale, FL (US)

(72) Inventor: Peyton Webb Robertson, Fort Lauderdale, FL (US)

( * ) Notice: Subject to any disclaimer, the term of this patent is extended or adjusted under 35 U.S.C. 154(b) by 0 days.

(21) Appl. No.: 16/373,225

(22) Filed: Apr. 2, 2019

Related U.S. Application Data

(63) Continuation of application No. 16/370,281, filed on Mar. 29, 2019, now abandoned.

(51) Int. Cl.
| | |
|---|---|
| *G05D 1/00* | (2006.01) |
| *B63B 35/00* | (2020.01) |
| *B63G 8/00* | (2006.01) |
| *B64C 39/02* | (2006.01) |
| *B64D 47/08* | (2006.01) |
| *G01C 21/20* | (2006.01) |
| *B63B 7/02* | (2020.01) |
| *B63B 22/00* | (2006.01) |
| *B63B 7/00* | (2020.01) |

(52) U.S. Cl.
CPC .............. *G01C 21/203* (2013.01); *B63B 7/00* (2013.01); *B63B 7/02* (2013.01); *B63B 22/00* (2013.01); *B63B 2007/003* (2013.01); *B63B 2022/006* (2013.01); *B63B 2211/02* (2013.01)

(58) Field of Classification Search
CPC ............ G01C 21/203; B63B 2007/003; B63B 2022/006; B63B 7/00; B63B 2211/02; B63B 7/02; B63B 22/00
See application file for complete search history.

(56) References Cited

U.S. PATENT DOCUMENTS

| | | |
|---|---|---|
| 6,185,988 B1 | 2/2001 | Baxter, Jr. |
| 6,269,763 B1 | 8/2001 | Woodland |
| 7,226,328 B1 | 6/2007 | Puzella et al. |
| 7,666,045 B2 | 2/2010 | Nigel |
| 7,789,723 B2 | 9/2010 | Dane et al. |
| 8,418,642 B2 | 4/2013 | Vosburgh |
| 9,487,281 B2 | 11/2016 | Wolfenbarger |
| 9,676,455 B2 | 6/2017 | MacCready et al. |
| 10,011,337 B2 | 7/2018 | MacCready et al. |
| 10,450,040 B2 | 10/2019 | Radford et al. |
| 2015/0259033 A1 | 9/2015 | George et al. |
| 2017/0023702 A1* | 1/2017 | Smyth ..................... G01W 1/02 |
| 2017/0059333 A1* | 3/2017 | Ward ................... G01C 21/203 |
| 2018/0059230 A1* | 3/2018 | Snyder .................. G01S 7/6281 |

(Continued)

OTHER PUBLICATIONS

Non-Final Office Action issued in U.S. Appl. No. 16/373,279 dated Jun. 13, 2019.

(Continued)

*Primary Examiner* — Nga X Nguyen
(74) *Attorney, Agent, or Firm* — Michael T. Abramson; Holland & Knight LLP

(57) ABSTRACT

A computer-implemented method, computer program product, and computer system may include determining, by a computing device, a first location on a body of water. The first location may be transmitted to a drone buoy. Data may be received from the drone buoy. A second location on the body of water to send to the drone buoy may be determined based upon, at least in part, the data received from the drone buoy.

18 Claims, 11 Drawing Sheets

(56) References Cited

U.S. PATENT DOCUMENTS

2018/0107210 A1* 4/2018 Harnett .................. G01S 7/003
2018/0251199 A1 9/2018 Radford et al.

OTHER PUBLICATIONS

Final Office Action issued in U.S. Appl. No. 16/373,279 dated Nov. 29, 2019.
Notice of Allowance issued in U.S. Appl. No. 16/373,279 dated Feb. 10, 2020.

* cited by examiner

US 10,697,777 B1

SYSTEM AND METHOD FOR A BUOY DRONE AND PLACEMENT

RELATED APPLICATION(S)

This application is a Continuation of U.S. application Ser. No. 16/370,281, filed on Mar. 29, 2019, entitled "System and Method for a Buoy Drone and Placement", the contents of which are all incorporated herein by reference.

BACKGROUND

Hurricanes, cyclones, and typhoons (collectively "Tropical Storms") are names for the same atmospheric phenomenon. Their different names indicate the ocean basins in which they occur. On average each year, six major hurricanes form in the Atlantic and northeastern Pacific Ocean, sixteen major typhoons form in the northwestern Pacific Ocean, and five major cyclones form in the south Pacific or Indian Ocean. Collectively, these Tropical Storms create a twelve-month meteorological phenomenon that affects approximately 40 million people. In the last 20 years, Tropical Storms have collectively caused $1.1 trillion of damage and over 800,000 fatalities. Early and accurate forecasts of rapid intensification can prevent property damage and save lives.

Ocean buoys are data-collecting devices often placed at geographical lattice points or on oil rigs to measure key meteorological data. Buoy data is used to aid in the computation of storm intensity at the surface of the ocean, but stationary buoys are currently arranged arbitrarily relative to any given hurricane's path and thus might not collect data in regions of the storm that are most predictive of intensity. Drone buoys and an method to position them may provide greater data relevancy and more potential for early warning than the current arrangement of stationary buoys.

BRIEF SUMMARY OF DISCLOSURE

In one example implementation, a method, performed by one or more computing devices, and/or a computing system may include one or more processors and one or more memories configured to perform operations, and/or a computer program product may reside on a computer readable storage medium having a plurality of instructions stored thereon which, when executed across one or more processors, may cause at least a portion of the one or more processors to perform operations, that may include but are not limited to, determining, by a computing device, a first location on a body of water. The first location may be transmitted to a drone buoy. Data may be received from the drone buoy. A second location on the body of water to send to the drone buoy may be determined based upon, at least in part, the data received from the drone buoy.

One or more of the following example features may be included. Determining the second location may include determining one or more buoy placement scores. The one or more buoy placement scores may be based upon, at least in part, the data received from the drone buoy at the first location. Determining the one or more buoy placement scores may be based upon, at least in part, a Levenberg-Marquardt least squares or damped least-squares method. Determining the one or more buoy placement scores may be based upon, at least in part, a Nelder-Mean simplex, downhill simplex, or polytope methods. Determining the one or more buoy placement scores may be based upon, at least in part, on a Holland parametric tropic cyclone model. Determining the one or more buoy placement scores may include comparing the data received from the drone buoy at the first location with expected data at the first location. The data may include wind speed variation. Determining the one or more buoy placement scores may include identifying one or more scoring clusters.

In another example implementation, a method, performed by one or more computing devices, and/or a computing system may include one or more processors and one or more memories configured to perform operations, and/or a computer program product may reside on a computer readable storage medium having a plurality of instructions stored thereon which, when executed across one or more processors, may cause at least a portion of the one or more processors to perform operations, that may include but are not limited to, determining, by a drone buoy, a first location on a body of water. Data may be received by the drone buoy at the first location. A second location on the body of water to send the drone buoy may be determined based upon, at least in part, the data received by the drone buoy.

One or more of the following example features may be included. Determining the second location may include determining one or more buoy placement scores. The one or more buoy placement scores may be based upon, at least in part, the data received by the drone buoy at the first location. Determining the one or more buoy placement scores may be based upon, at least in part, a Levenberg-Marquardt least squares or damped least-squares method. Determining the one or more buoy placement scores may be based upon, at least in part, a Nelder-Mean simplex, downhill simplex, or polytope methods. Determining the one or more buoy placement scores is based upon, at least in part, a Holland parametric tropical cyclone model. Determining the one or more buoy placement scores may include comparing the data received by the drone buoy at the first location with expected data at the first location. The data may include wind speed variation. Determining the one or more buoy placement scores may include identifying one or more scoring clusters.

In another example implementation, a method, performed by one or more computing devices, and/or a computing system may include one or more processors and one or more memories configured to perform operations, and/or a computer program product may reside on a computer readable storage medium having a plurality of instructions stored thereon which, when executed across one or more processors, may cause at least a portion of the one or more processors to perform operations, that may include but are not limited to, determining, by a computing device, a first location on a body of water. The first location may be received by a drone buoy. Data may be received, at the computing device, from the drone buoy. A second location on the body of water to send to the drone buoy may be determined based upon, at least in part, the data received from the drone buoy.

One or more of the following example features may be included. Determining the second location may include determining one or more buoy placement scores. The one or more buoy placement scores may be based upon, at least in part, the data received by the drone buoy at the first location. Determining the one or more buoy placement scores may be based upon, at least in part, a Levenberg-Marquardt least squares or damped least-squares method. Determining the one or more buoy placement scores may be based upon, at least in part, a Nelder-Mean simplex, downhill simplex, or polytope methods. Determining the one or more buoy placement scores may be based upon, at least in part, a Holland parametric tropical cyclone model. Determining the one or more buoy placement scores may include comparing the data received by the drone buoy at the first location with expected data at the first location. The data may include wind speed variation. Determining the one or more buoy placement scores may include identifying one or more scoring clusters.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
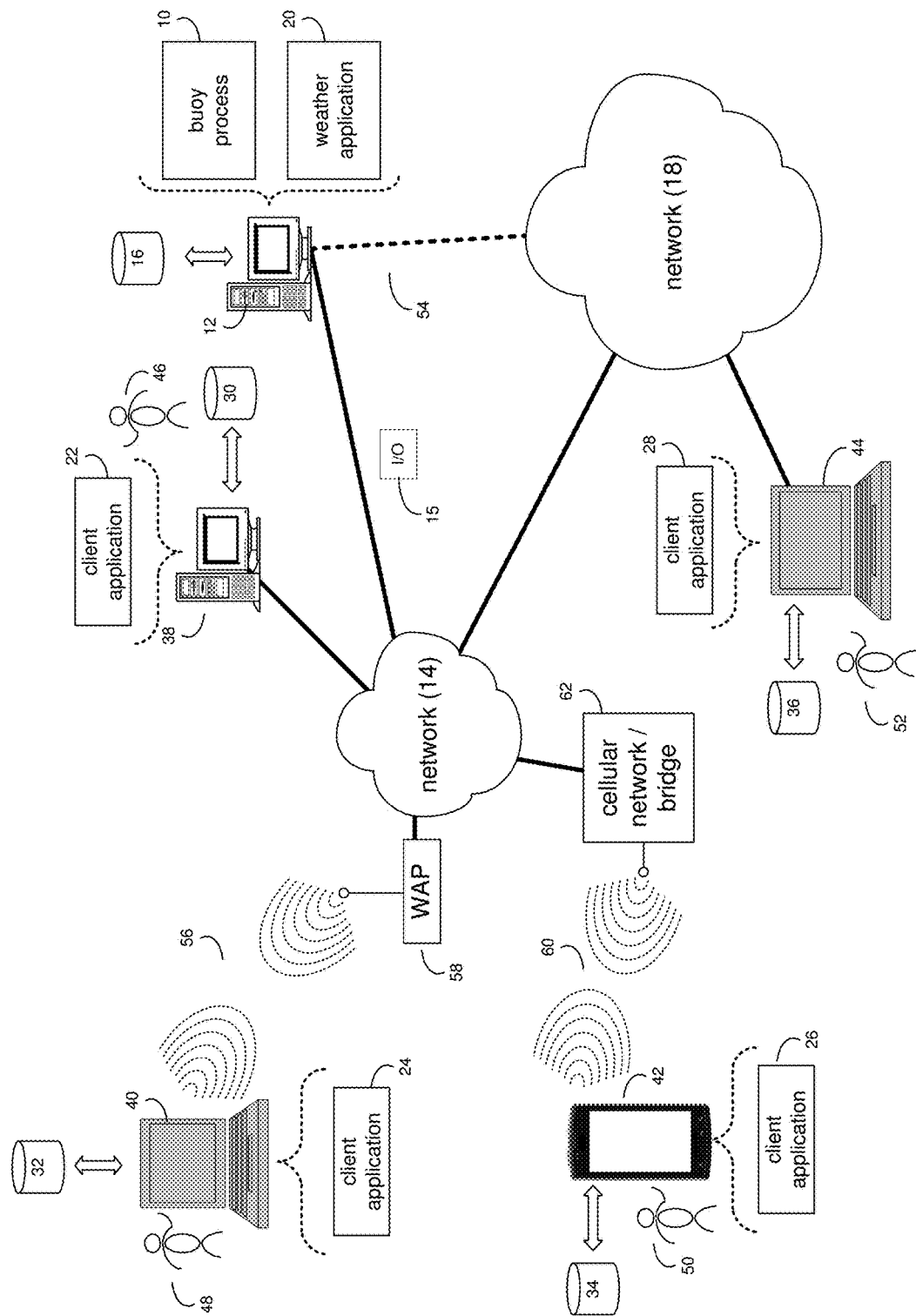
FIG. 1 is an example diagrammatic view of a buoy process coupled to an example distributed computing network according to one or more example implementations of the disclosure.

System Overview:

Hurricanes, cyclones, and typhoons (collectively "Tropical Storms" are names for the same atmospheric phenomenon. Their different names indicate the ocean basins in which they occur. On average each year, six major hurricanes form in the Atlantic and northeastern Pacific Ocean, sixteen major typhoons form in the northwestern Pacific Ocean, and five major cyclones form in the south Pacific or Indian Ocean. Collectively, these Tropical Storms create a twelve-month meteorological phenomenon that affects approximately 40 million people. In the last 20 years, Tropical Storms have collectively caused $1.1 trillion of damage and over 800,000 fatalities. Early and accurate forecasts of rapid intensification can prevent property damage and save lives.

Ocean buoys are data-collecting devices often placed at geographical lattice points or on oil rigs to measure key meteorological data. Buoy data is used to aid in the computation of storm intensity at the surface of the ocean, but stationary buoys are currently arranged arbitrarily relative to any given hurricane's path and thus may not collect data in regions of the storm that are most predictive of intensity. Drone buoys and an heuristic to position them provide greater data relevancy and more potential for early warning than the current arrangement of stationary buoys. In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a buoy process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a buoy process, such as buoy process 10 of FIG. 1, may include but is not limited to determining, by a computing device, a first location on a body of water. The first location may be transmitted to a drone buoy. Data may be received from the drone buoy. A second location on the body of water to send to the drone buoy may be determined based upon, at least in part, the data received from the drone buoy.

In some implementations, as will be discussed below in greater detail, a buoy process, such as buoy process 10 of FIG. 1, may include but is not limited to determining, by a drone buoy, a first location on a body of water. Data may be received by the drone buoy at the first location. A second location on the body of water to send the drone buoy may be determined based upon, at least in part, the data received by the drone buoy.

In some implementations, as will be discussed below in greater detail, a buoy process, such as buoy process 10 of FIG. 1, may include but is not limited to determining, by a computing device, a first location on a body of water. The first location may be received by a drone buoy. Data may be received, at the computing device, from the drone buoy. A second location on the body of water to send to the drone buoy may be determined based upon, at least in part, the data received from the drone buoy.

In some implementations, the instruction sets and subroutines of buoy process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, buoy process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a weather application (e.g., weather application 20), examples of which may include, but are not limited to Doppler radar, radar, satellite imaging, dropsonde application, weather station reporting, or individual or aggregate storm modeling applications.

In some implementations, buoy process 10 and/or weather application 20 may be accessed via one or more of client applications 22, 24, 26, 28. In some implementations, buoy process 10 may be a standalone application, or may be an applet/application/script/extension that may interact with and/or be executed within weather application 20, a component of weather application 20, and/or one or more of client applications 22, 24, 26, 28. In some implementations, weather application 20 may be a standalone application, or may be an applet/application/script/extension that may interact with and/or be executed within buoy process 10, a component of buoy process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of buoy process 10 and/or weather application 20. Examples of client applications 22, 24, 26, 28 may include, but are not limited to, e.g., weather application 20, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a drone buoy, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of buoy process 10 (and vice versa). Accordingly, in some implementations, buoy process 10 may be a purely server-side application, a purely client-side application, or a hybrid server-side/client-side application that is cooperatively executed by one or more of client applications 22, 24, 26, 28 and/or buoy process 10.

In some implementations, one or more of client applications 22, 24, 26, 28 may be configured to effectuate some or all of the functionality of weather application 20 (and vice versa). Accordingly, in some implementations, weather application 20 may be a purely server-side application, a purely client-side application, or a hybrid server-side/client-side application that is cooperatively executed by one or more of client applications 22, 24, 26, 28 and/or weather application 20. As one or more of client applications 22, 24, 26, 28, buoy process 10, and weather application 20, taken singly or in any combination, may effectuate some or all of the same functionality, any description of effectuating such functionality via one or more of client applications 22, 24, 26, 28, buoy process 10, weather application 20, or combination thereof, and any described interaction(s) between one or more of client applications 22, 24, 26, 28, buoy process 10, weather application 20, or combination thereof to effectuate such functionality, should be taken as an example only and not to limit the scope of the disclosure.

In some implementations, one or more of users 46, 48, 50, 52 may access computer 12 and buoy process 10 (e.g., using one or more of client electronic devices 38, 40, 42, 44) directly through network 14 or through secondary network 18. Further, computer 12 may be connected to network 14 through secondary network 18, as illustrated with phantom link line 54. Buoy process 10 may include one or more user interfaces, such as browsers and textual or graphical user interfaces, through which users 46, 48, 50, 52 may access buoy process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
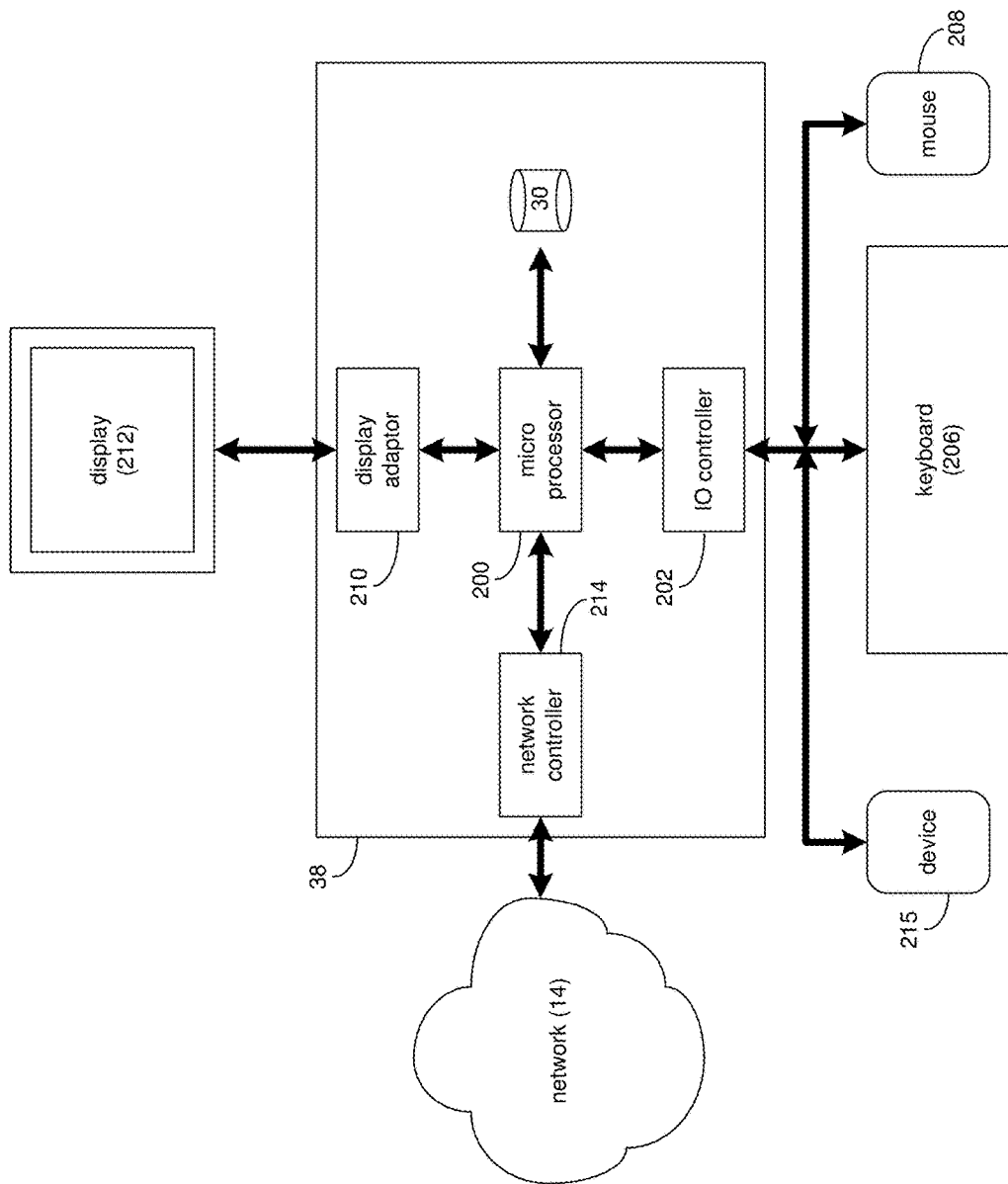
FIG. 2 is an example diagrammatic view of a computing device of FIG. 1 according to one or more example implementations of the disclosure.
Figure 3:
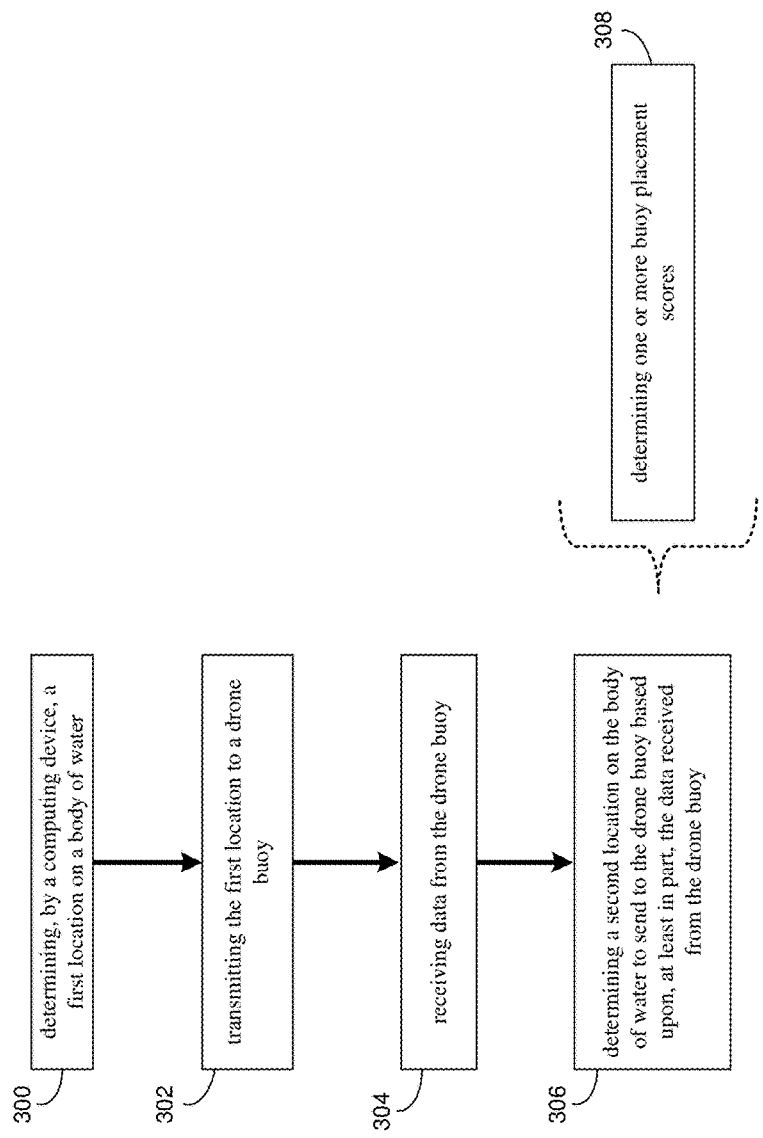
FIG. 3 is an example flowchart of a buoy process according to one or more example implementations of the disclosure.
Figure 4:
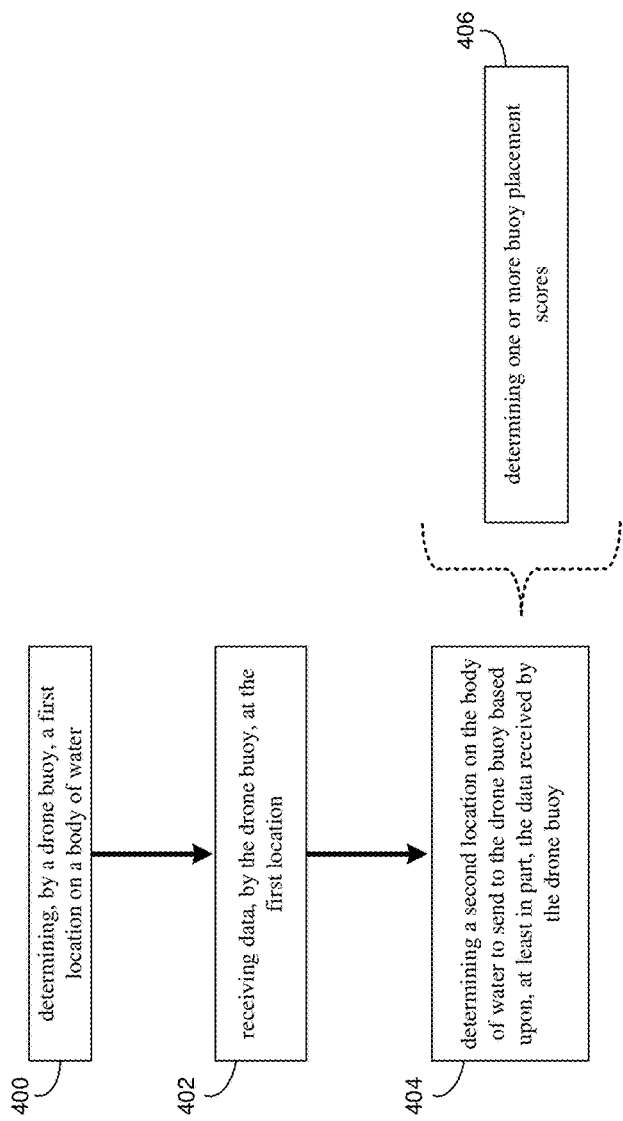
FIG. 4 is an example flowchart of a buoy process according to one or more example implementations of the disclosure.
Figure 5:
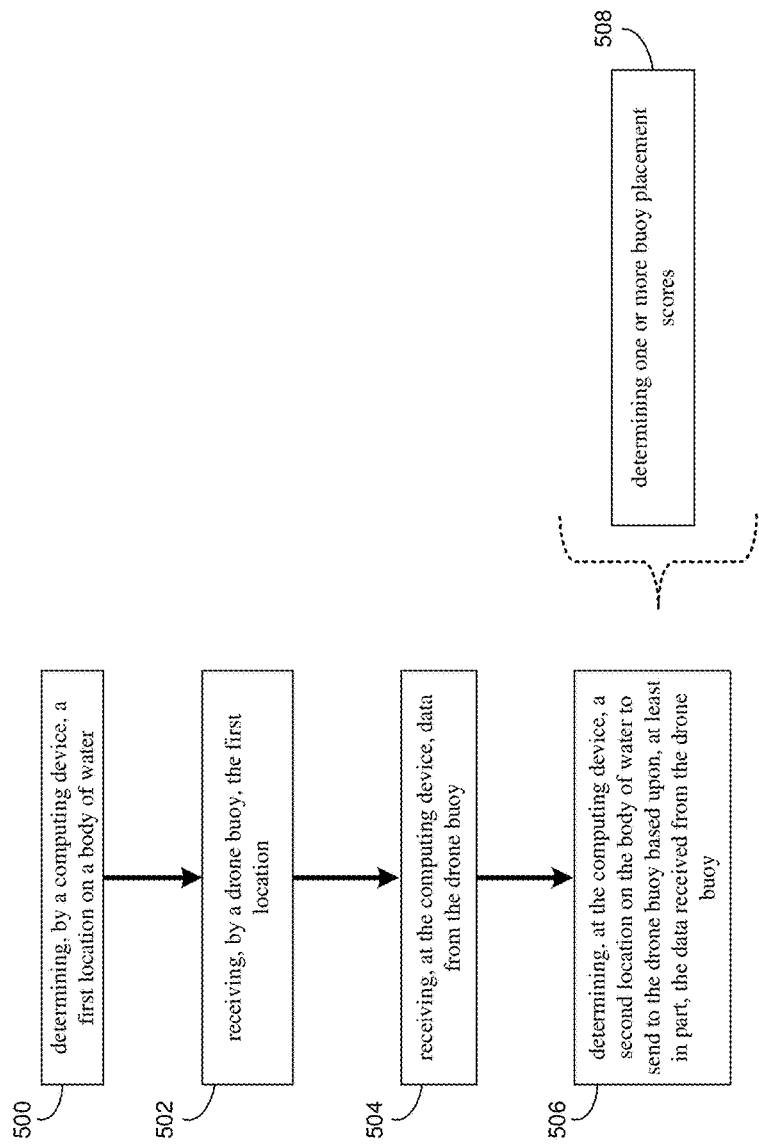
FIG. 5 is an example flowchart of a buoy process according to one or more example implementations of the disclosure.
Figure 6:
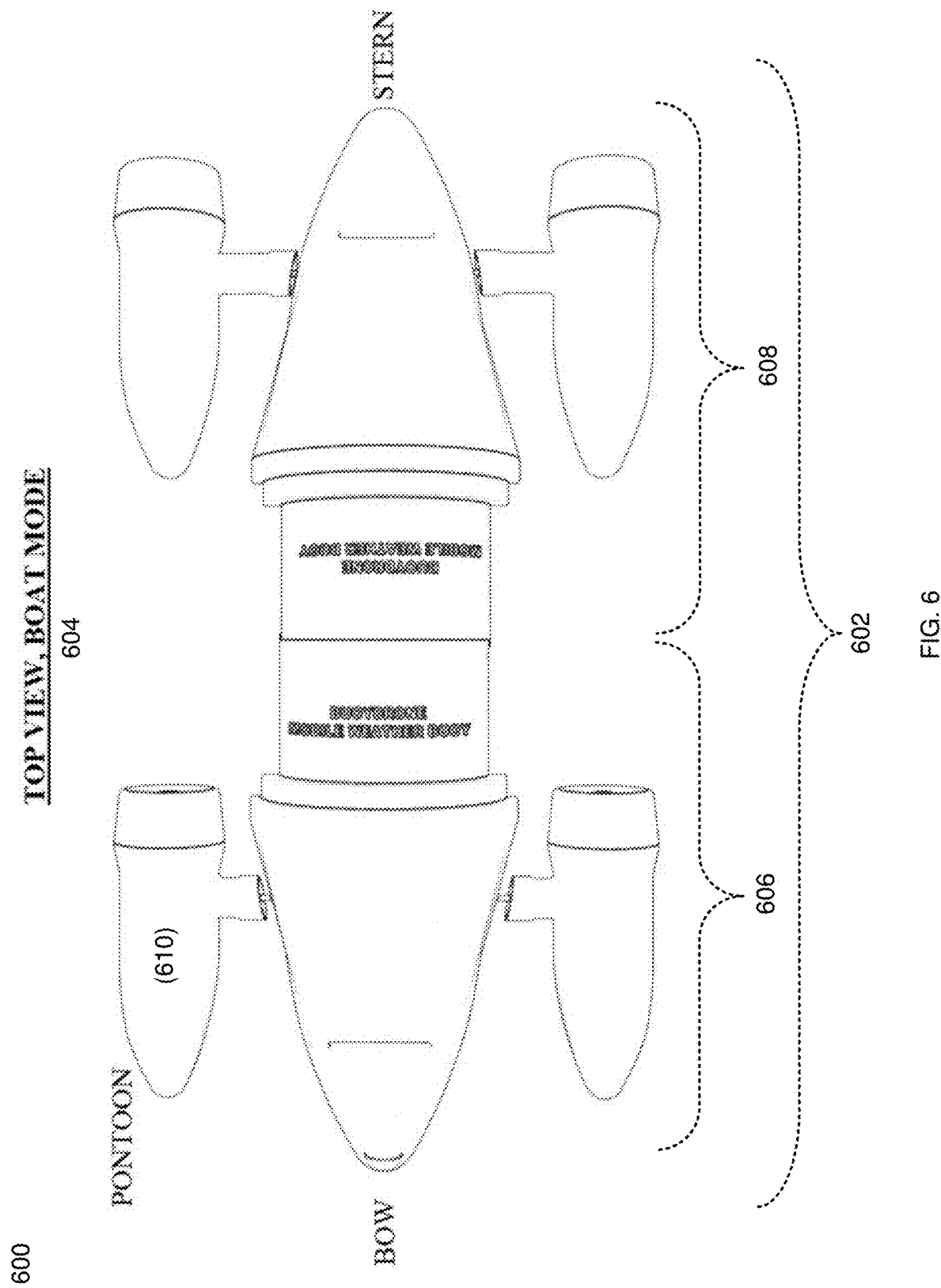
FIG. 6 is an example of a top view of a drone buoy in a first configuration according to one or more example implementations of the disclosure.
Figure 7:
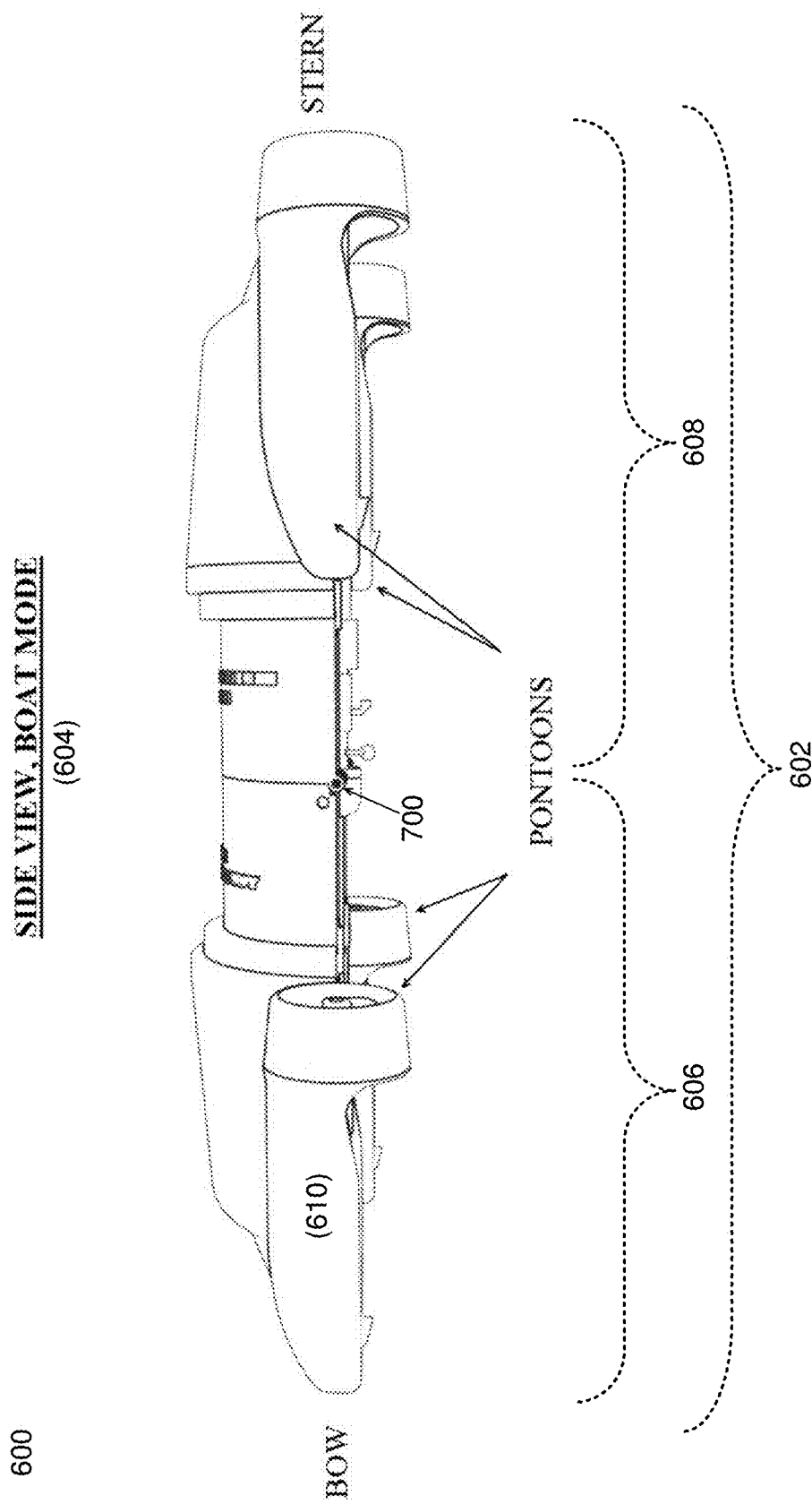
FIG. 7 is an example of a side view of a drone buoy in a first configuration according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, buoy process 10 may be substituted for client electronic device 38 (in whole or in part) within FIG. 2, examples of which may include but are not limited to computer 12 and/or one or more of client electronic devices 40, 42, 44, and/or a drone buoy.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, buoy process 10 may at least help, e.g., optimally position ocean buoys for any given major storm to provide more relevant and continuous weather related input data to weather forecasters. For example, buoy process 10 may provide a method to position a mobile ocean buoy at various target drop locations on a body of water, wherein the ocean buoy may be deployed from a particular altitude to measure storm conditions as the ocean buoy falls to the surface of the water. As buoy data may be critical for forecasting essential weather and track information relative to the storm and its path, buoy process 10 may, e.g., allow for greater preparation lead time, which may reduce property damage and save lives. Additionally, buoy process 10 may provide a mechanism for transforming the ocean buoy between an autonomous sailing (i.e., moving) vessel to an instrumented ocean buoy capable of anchoring at a particular location along a storm path to gather the best storm/weather related data. As such, buoy process 10 may require deploying fewer numbers of ocean buoys, and may provide greater impact in developing countries with weaker economic standing. It will be appreciated that the computer processes described throughout are not considered to be well-understood, routine, and conventional functions and are implemented in an example practical application at least to improve technological processes of storm/weather data gathering.

Buoy and Buoy Process:

As discussed above, and referring also at least to the example implementations of FIGS. 3-11, an example of apparatus 600 may comprise drone buoy 602 configured to float on a body of water. Drone buoy 602 may include first configuration 604 and second configuration 900, wherein drone buoy 602 may be configured to transition between first configuration 604 and second configuration 900.

In some implementations, apparatus 600 may comprise drone buoy 602 configured to float on a body of water. For example, and referring at least to the example implementation of FIG. 6, an example apparatus 600 is shown. For example, in some implementations, drone buoy 602 may include first portion 606 and second portion 608, wherein first configuration 604 may include first portion 606 and second portion 608 along the same plane. For example, and referring at least to the example implementation of FIG. 6, first portion 606 may include a bow of drone buoy 602, and second portion 608 may include a stern of drone buoy 602 aligned in the same plane. It will be appreciated that first portion 606 and second portion 608, when in first configuration 604, may be along the same plane in that they may be oriented in a line to the same degree along a surface.

Figure 8:
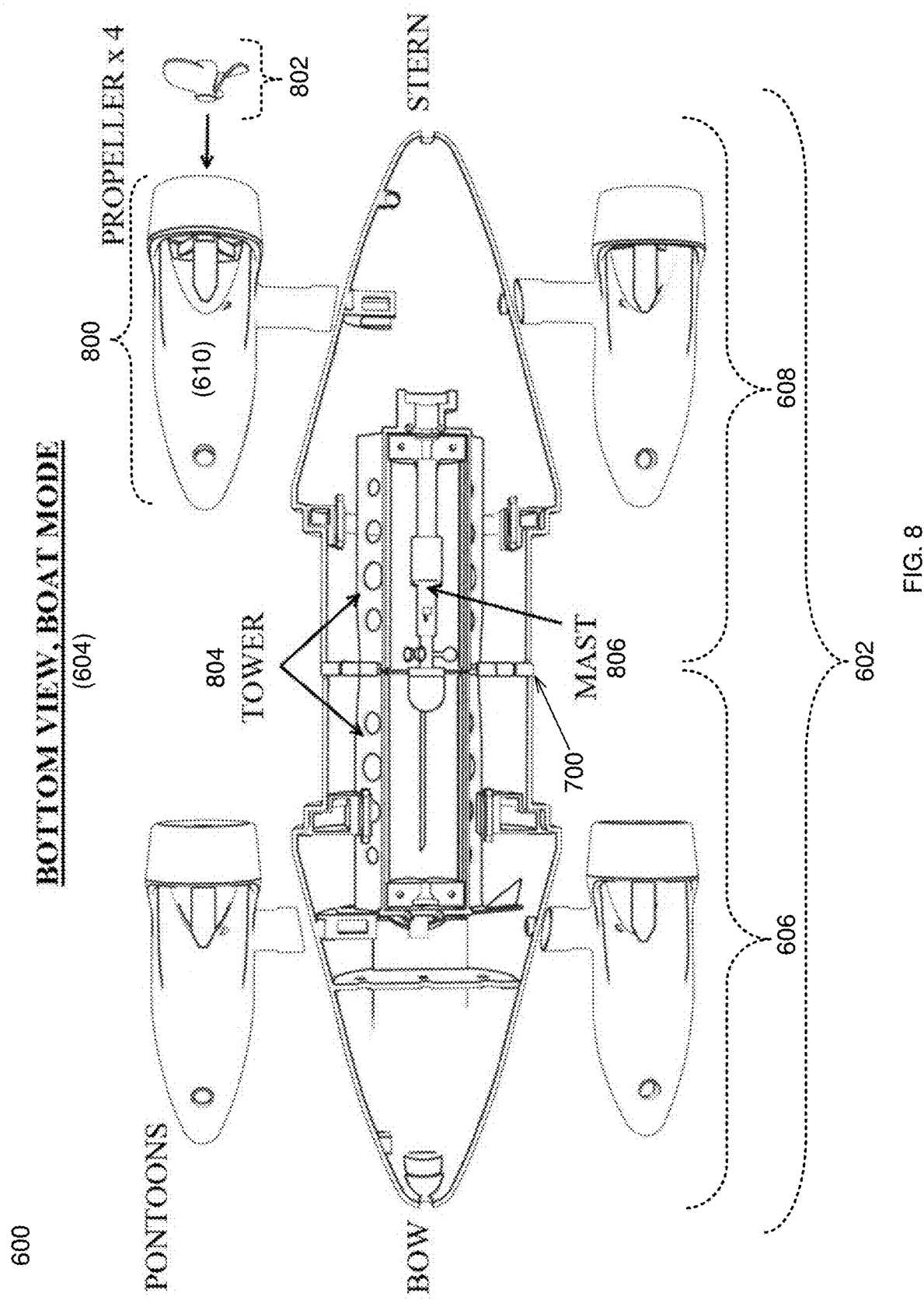
FIG. 8 is an example of a bottom view of a drone buoy in a first configuration according to one or more example implementations of the disclosure.
Figure 9:
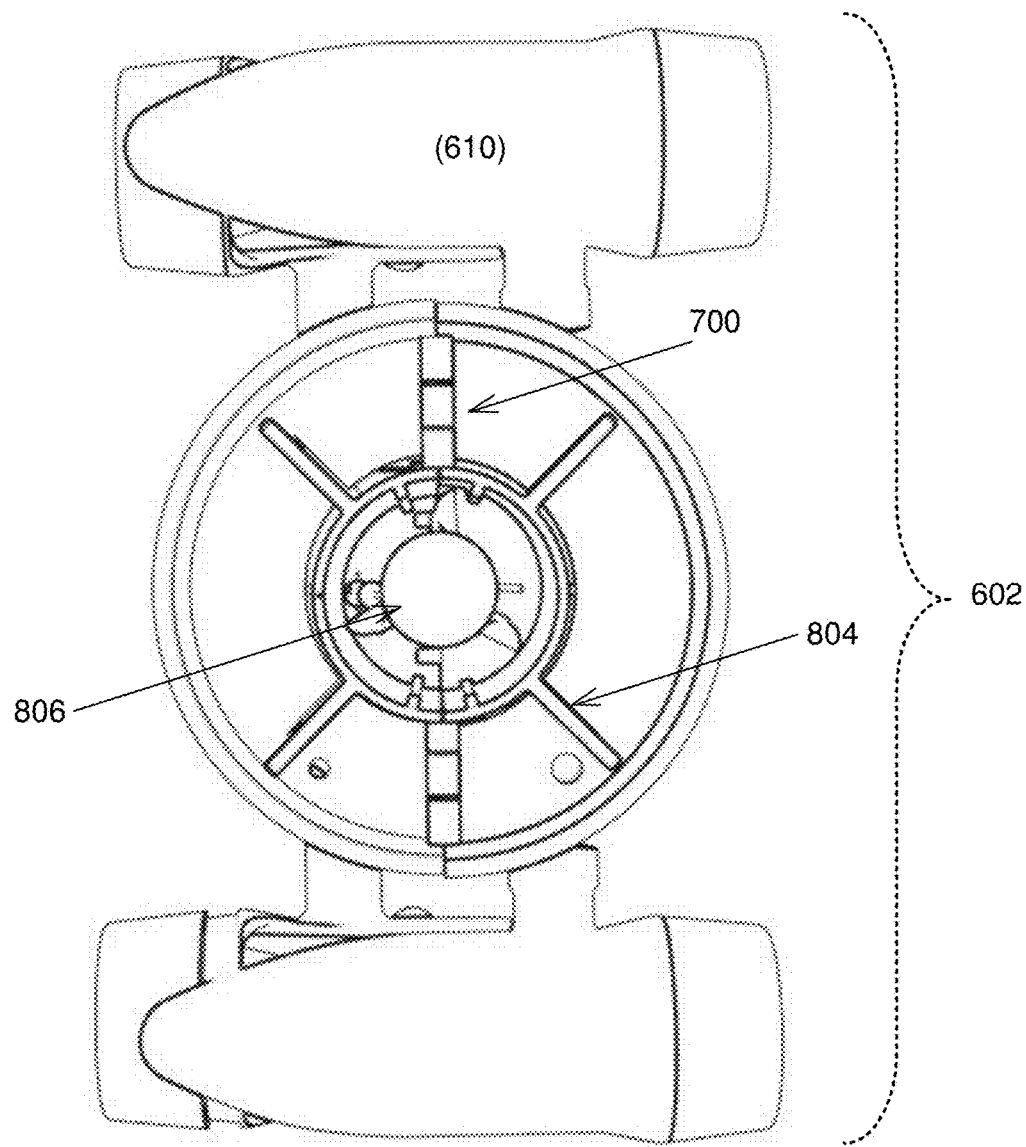
FIG. 9 is an example of a top view of a drone buoy in a second configuration according to one or more example implementations of the disclosure.
Figure 10:
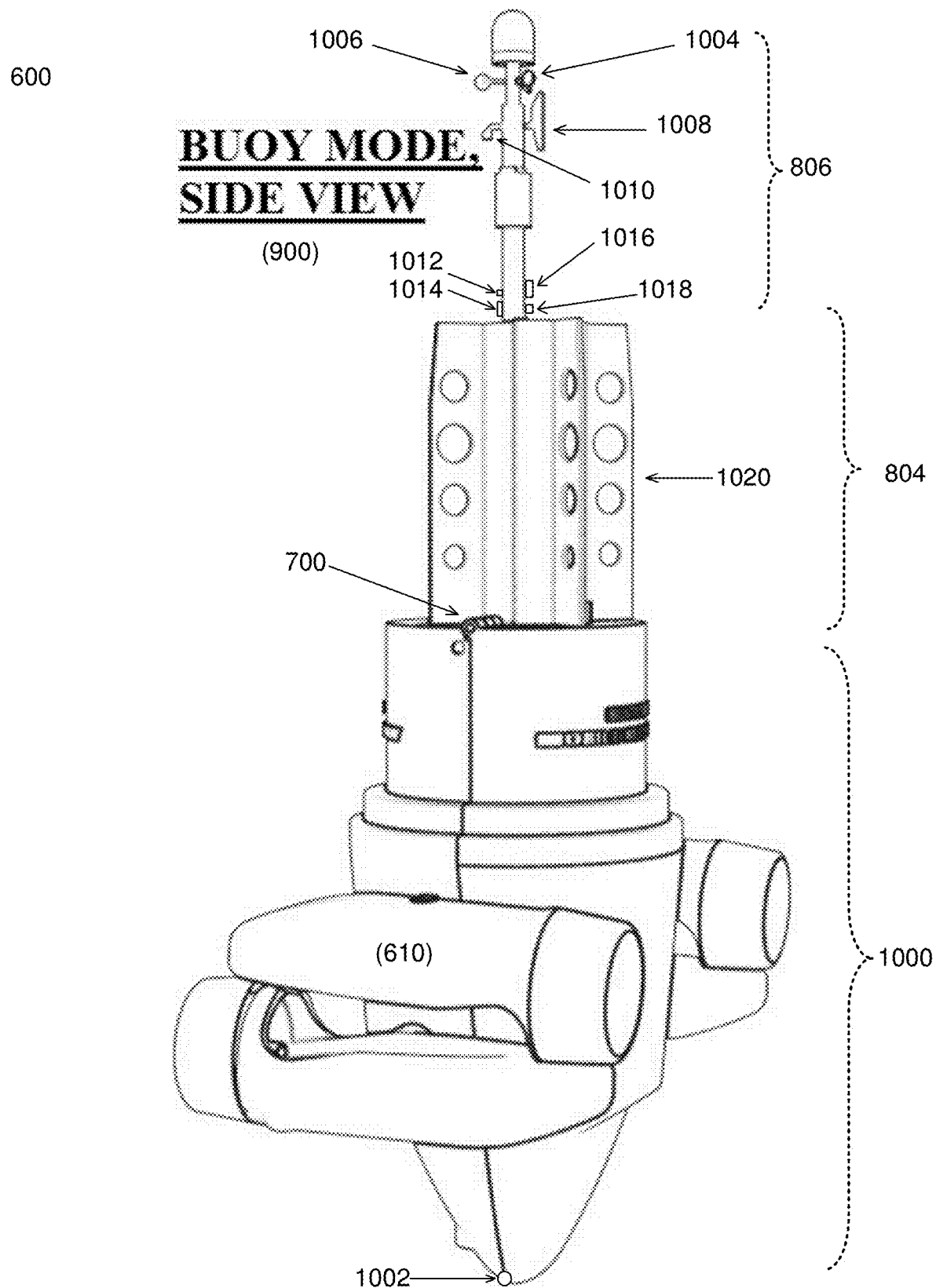
FIG. 10 is an example of a side view of a drone buoy in a second configuration according to one or more example implementations of the disclosure.
Figure 11:
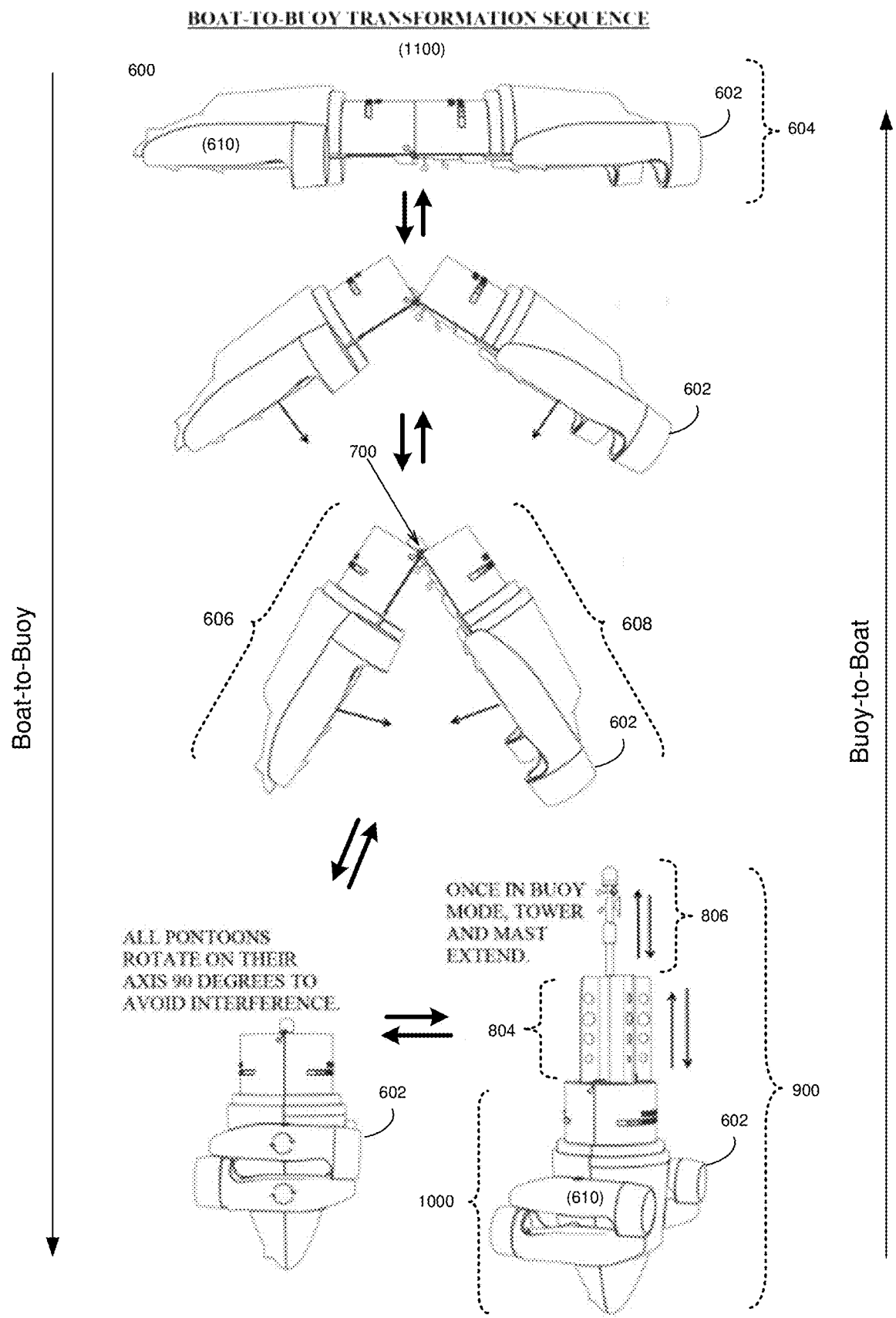
FIG. 11 is an example of a transformation sequence of a drone buoy according to one or more example implementations of the disclosure.

In some implementations, and referring also at least to the example implementation of FIG. 8, drone buoy 602 may further comprise at least one propulsion system 800. For example, propulsion system 800 (which may include a power source, e.g., ramjet, rocket, turbine engine, motor, propeller, pressurized-water naval nuclear, fuel cell, solar, etc.) may enable drone buoy 602 to become mobile and move to and from multiple locations as will be discussed in greater detail below.

In some implementations, the at least one propulsion system 800 may include a propeller (e.g., propeller 802). For example, propeller 802 coupled to a power source may be an example of propulsion system 800 that may enable drone buoy 602 to move to and from multiple locations.

In some implementations, drone buoy 602 may have at least one propulsion system 800 on each side of first portion 606 and second portion 608, wherein each of the at least one propulsion system 800 on each side of first portion 606 and second portion 608 may be positioned along the same plane in first configuration 604. It will be appreciated that drone buoy 602 may include more or less propulsion systems as well as various locations of the propulsion systems shown in FIG. 6. As such, the description of four propulsion systems and their location should be taken as example only and not to otherwise limit the scope of the disclosure.

In some implementations, the at least one propulsion system 800 may be housed in a pontoon (e.g., pontoon 610). For example, pontoon 610 may provide a mobile floating platform to support drone buoy 602 on a body of water (e.g., lake, ocean, pond, etc.). In some implementations, for example, pontoon 610 may constructed from various different materials (e.g., plastic, metal, wood with adhesives, composites (including but not limited to fiberglass, carbon fiber, aramid fiber), or any combination thereof).

In some implementations, drone buoy 602 may include first configuration 604 and second configuration 900, wherein drone buoy 602 may be configured to transition between first configuration 604 and second configuration 900. For example, as discussed above and also referring at least to the example implementation of FIGS. 6-8, drone buoy 602 may include a first configuration (e.g., first configuration 604), and also referring at least to the example implementation of FIGS. 9-11, drone buoy 602 may include a second configuration (e.g., second configuration 900). In some implementations, first configuration 604 of drone buoy 602 may include a particular mode (e.g., boat mode), and second configuration 900 of drone buoy 602 may include another particular mode (e.g., buoy mode). In some implementations, for example, when drone buoy 602 is in first configuration 604, drone buoy 602 may use propulsion system 800 to become mobile and move to and from multiple locations as will be discussed in greater detail below. In some implementations, for example, when drone buoy 602 is in second configuration 900, propulsion system 800 of drone buoy 602 may stop, enabling drone buoy 602 to remain fixed at a particular location on a body of water as will be discussed in greater detail below.

In some implementations, drone buoy 602 may include first portion 606 and second portion 608, wherein first portion 606 and second portion 608 may be parallel in second configuration 900. For example, and referring at least to the example implementations of FIGS. 9-11, first portion 606 and second portion 608 may be configured to submerge and meet under water to form base 1000 of drone buoy 602. It will be appreciated that other possible configurations of drone buoy 602 may be used without departing from the scope of the disclosure. That is, any configuration that transitions drone buoy between a mobile mode (e.g., boat mode) and a stationary mode (e.g., buoy mode) may be used without departing from the scope of the present disclosure. As such, the specific configurations of first configuration 604 and second configuration 900 should be taken as example only and not to otherwise limit the scope of the present disclosure. It will be appreciated that while the present disclosure is described as being capable of transforming into different configurations, drone buoy 602 may perform any of the functions described throughout in a single (non-transformative) configuration. For example, drone buoy 602 may be designed similar to a pocket knife for example and the tower and mast may rise out of the buoy like the blades of a pocket knife. Other configurations are possible as well. As such, the description of drone buoy 602 being transformative should be taken as example only and not to otherwise limit the scope of the present disclosure. In some implementations, drone buoy 602 may further comprise hinge 700, wherein first portion 606 and second portion 608 may be coupled by hinge 700 to transition between first configuration 604 and second configuration 900. For example, first portion 606 and second portion 608 may be coupled by hinge 700 (as shown at least in the example implementations of FIG. 7-11) to transition between first configuration 604 and second configuration 900. For instance, the transition between first configuration 604 and second configuration 900 may include "boat-to-buoy" transformation sequence 1100 (and buoy-to-boat transformation sequence in the reverse). Accordingly, and continuing with the example above, the transition between first configuration 604 and second configuration 900 may include first portion 606 and second portion 608 folding inwardly at hinge 700. In some implementations, the folding may be executed using numerous methods, such as, e.g., rack and pinion gears driven by an electric actuator. In some implementations, as first portion 606 and second portion 608 fold inwardly at hinge 700, pontoon 610 may rotate on its axis at, e.g., 90 degrees to avoid interference with any other pontoon 610 that may exist on drone buoy 602.

In some implementations, drone buoy 602 may further comprise a retractable tower (e.g., retractable tower 804). For example, during boat-to-buoy transformation sequence 1100, propeller 802 in propulsion system 800 may stop, which may trigger the release of an anchor (e.g., anchor XX) and extension of retractable tower 804 from base 1000 of drone buoy 602. In some implementations, the extension/retraction may be executed using numerous methods, such as, e.g., an inline electric actuator. In some implementations, the anchor may be located in its own enclosure (e.g., on the bow). It may be connected to drone buoy 602 via a chain (or cable, rope, wire, etc.) attached to the capstan.

In some implementations, drone buoy 602 may be maintained at a desired location by using its propellers. Information from a GPS satellite (or other source) may be received by drone buoy 602. An on board computer may selectively start/stop/reverse the propeller motors to maintain the desired location. As will be discussed below, when buoy process 10 determines, based on the movement of a storm path, a more optimal position required for drone buoy 602 to receive and transmit accurate input data, retractable tower 804 may retract into base 1000 and propeller 802 may start again, allowing drone buoy 602 to sail to the next location (e.g., where more accurate data from the storm/ weather may be gathered). Drone buoy 602 may include an Acoustic Doppler Current Profiler (ADCP) 1002, wherein ADCP may be proximate base 1000. In some implementations, scientists may use ADCP 1002 to measure how fast water is moving across an entire water column. ADCP 1002 may measure water currents with sound, using a principle of sound waves called the Doppler effect.

In some implementations, drone buoy 602 may further comprise a retractable mast (e.g., retractable mast 806), wherein retractable mast 806 may be proximate retractable tower 804. For example, after retractable tower 804 extends from base 1000, retractable mast 806 may further extend from retractable tower 804. In some implementations, the extension/retraction may be executed using numerous methods, such as, e.g., an inline electric actuator working with the tower actuator.

In some implementations, retractable mast 806 may include at least one instrument. For example, at least one instrument may include at least one of anemometer 1004, pyranometer 1006, satellite antenna 1008, meteorological/ temperature gauge 1010, pyrometer 1012 and thermosalinograph 1014, barometer 1016, and GPS-Aided Inertial Navigation Unit (INS) 1018. Anemometer 1004 may measure wind speed and wind direction. Pyranometer 1006 may measure solar radiation. Satellite antenna and/or satellite dish 1008 may receive and transmit data to/from the drone buoy. Meteorological/temperature gauge 1010 may measure air temperature and relative humidity. Pyrometer 1012 and thermosalinograph 1014 may measure water temperature. Barometer 1016 may measure surrounding pressure. GPS-Aided INS 1018 may be used to measure wave height, wave intervals, and direct optimal drone buoy placement on the body of water (e.g., based upon analysis at least of the gathered data, discussed more below).

In some implementations, at least one instrument may include a plurality of solar panels 1020. For example, solar panels 1020 may provide power to propulsion system 800, and any of the above noted instruments as well as any other components associated with drone buoy 602. However, it will be appreciated that other power sources may be used without departing from the scope of the disclosure.

In some implementations, drone buoy 602 may further comprise a computing device configured to receive one or more instructions for drone buoy 602 to transition between first configuration 604 and second configuration 900, as will be discussed below.

As discussed above and referring also at least to the example implementations of FIGS. 3-11, buoy process 10 may determine 300, by a computing device, a first location on a body of water. Buoy process 10 may transmit 302 the first location to drone buoy 602. Buoy process 10 may receive 304 data from drone buoy 602. Buoy process 10 may determine 306 a second location on the body of water to send to drone buoy 602 based upon, at least in part, the data received from drone buoy 602.

In some implementations, buoy process 10 may determine 300, by a computing device, a first location on a body of water. For instance, assume for example purposes only that an initial location of where to place drone buoy 602 needs to be determined to provide an accurate account of input data received from an actual storm path. For example, by accessing and analyzing historical data from the National Oceanic and Atmospheric Administration's (NOAA) National Data Buoy Center, and more specifically analyzing the Standard Meteorological and Continuous Wind Database for all hurricanes since 2004 and verified data statistically against other substantiated data sources, buoy process 10 may determine 300 an optimal drone buoy placement for drone buoy 602 at the first location to provide more relevant and continuous input data to weather forecasters. In some implementations, drone buoy 602 may be manually placed at the first location. In some implementations, drone buoy 602 may transition to first configuration 604 to travel to the first location.

In some implementations, buoy process 10 may plot historical buoy position scores and associated data bumps, cluster high performing mean distances, and may use that as noted with the above information to determine 300 an initial position (e.g., first location) around an approaching storm. The Holland Model, which expresses wind speed at a given location as a function of distance from the storm eye, may allow buoy process 10 to calculate and compare the expected wind speed at a given buoy location to the actual buoy data received in order to score the relevancy of the data provided by a given position. Buoy process 10 may plot historical buoy position scores and their data bumps, cluster high performing mean distances, and use that as a framework to set initial positions around an approaching storm. This may propose an initial position and repeat the analysis so accuracy is improved over time with larger data sets. As an example, buoy process 10 may:

Access and validate buoy data from public databases (or otherwise)

Code a scoring system for buoy positions

Apply techniques to recommend buoy positions (discussed throughout)

Incorporate practical limitations of the drone buoy

Repeat to improve accuracy for subsequent positions

In some implementations, buoy process 10 may access the buoy data by web scraping, e.g., the public NOAA Standard Meteorological and Continuous Wind Database (or via manual or automatic downloading of the same). Buoy process 10 may use all Atlantic hurricane data at least since 2004. Buoy process 10 may compare this empirical buoy data to substantiated data from other sources using, e.g., the Revised Atlantic Hurricane Database (HURDAT2). In some implementations, buoy process 10 may use wind velocity at the RMW location to compute the B parameter. Buoy process 10 may then read in 34, 50, and 64 knot maximum wind speed extents (e.g., the current maximum distance at which wind speeds of these velocities may be found in a given quadrant), averaged out by quadrant, and run a least-squares regression in order to determine the RMW corresponding to the previously computed value of B (pre-computing the value of B may be done to simplify the dimension of the output space of the regression algorithm). Buoy process 10 may compare mean values of B and RMW observed in a dataset at, e.g., every 6 hour time coordinate, since 2004 with the values for those statistics reported by any known source: a mean B-value of 1.31 (with meaningful values of B ranging from 0.5 to 2.5), a mean value of maximum wind speed of 36.2 m/s, and a mean RMW of 46.1 km. Across these three or more example and non-limiting parameters, the distribution of their cleaned dataset may be materially consistent with the sample.

Heuristics used to validate the data for scoring a given buoy position may include, e.g., scoring the buoys directly on their ability to produce RMW and B parameters consistent with HURDAT2 using multiple multi-dimensional regression techniques including Levenberg-Marquardt least-squares, and the Nelder-Mead simplex algorithm (minimizing the sum of squares of residuals), machine learning algorithms to detect patterns in the dataset of buoy observations that maximized the score, TensorFlow Keras to build a sequential model that maps the full input space to scores, a beam search method to identify the conditional probability that the presence of one buoy in a given location would be helpful given another buoy's location, etc.

As another example technique, for every buoy within 1,000 km of a storm (a generous filter given average hurricane size), buoy process 10 may compare the expected Holland model winds at the buoy's location as computed from RMW and B values (linearly interpolated for data points taken between HURDAT2's 6 hour interval measurements) with the observed wind speed. Buoy process 10 may compute the percent error and track these measurements, e.g., in a Pandas DataFrame (e.g., 38,300 observations). Buoy process 10 may amalgamate the results to compute a score for each buoy during some or every post 2004 Atlantic hurricane: taking the mean error of observations and the negative logarithm of this mean to determine the final score (higher scores representing smaller errors).

In some implementations, buoy process 10 may then use the properties of the highest scoring buoys to determine buoy placements. Analyzing the time series of buoy data, buoy process 10 may be able to abstract the wind speed variation of a single buoy into a "data bump"—as the storm passes the wind speed data spikes. Buoy process 10 may integrate the example and non-limiting limitations of the drone buoy—namely, its difficulty retaining power as a storm passes because less solar radiation passes through clouds. Consequently, buoy process 10 may implement the practical goal of finding a set of locations for buoys to remain while the storm passes. Before and after the storm, the drone buoys may be adjusted at will.

In some implementations, buoy process 10 may plots data bumps of highest scoring buoys, with their mean distance from the eye on one axis and the time producing relevant data on another. Using clusters, buoy process 10 may plot positions for done buoys for any hurricane.

In some implementations, buoy process 10 may transmit 302 the first location to the drone buoy. For instance, assume for example purposes only that a remote computing device (e.g., client electronic device 38) has determined 300 the first location as noted above. In the example, client electronic device 38 may transmit 302 the first location (e.g., I/O 15) which may be received by drone buoy 602. In some implementations, transmitting 302 the first location to drone buoy 602 may include transmitting a GPS location (or other locational based coordinates such as latitude and longitude) based upon, at least in part, the analysis conducted by the buoy process 10 as indicated above.

In some implementations, buoy process 10 may receive 304 data from drone buoy 602. For example, drone buoy 602 may collect data (e.g., while in second configuration 900) relative to a surrounding storm from any of the one or more sensor-based instruments referenced above and may transmit the data to the remote client electronic device. As noted above, the one or more sensor based instruments may include anemometer 1004, pyranometer 1006, satellite antenna 1008, meteorological/temperature gauge 1010, pyrometer 1012 and thermosalinograph 1014, barometer 1016, and GPS-Aided INS 1018. As also noted above, receiving 304 data from drone buoy 602 at the first location may include a set of locations for drone buoy 602 to remain while a storm passes. It will be understood, however, that drone buoy 602 may be adjusted at will before the storm arrives and/or after the storm passes. In some implementations, the adjustment may take into account the technical limitations of the drone buoy (e.g., how much power it can maintain before it needs solar recharging) and the scores of potential locations in order to suggest a subsequent position.

In some implementations, buoy process 10 may determine 306 a second location on the body of water to send to drone buoy 602 based upon, at least in part, the data received from drone buoy 602. For example, the second location may indicate optimal drone buoy placement for drone buoy 602 to continue providing accurate and relevant input data consistent with the storm path (or wherever drone buoy may be directed to go for any other reason), since more accurate data may come from drone buoy 602 being as close to the storm as possible. As such, buoy process 10 may determine 306 such a location based upon, at least in part, the data received from drone buoy 602.

In some implementations, determining 306 the second location may include determining 308 one or more buoy placement scores. For example, determining 308 one or more buoy placement scores may include coding a scoring system for determining optimal drone buoy placement. For instance, in some implementations, determining 308 one or more buoy placement scores may be based upon, at least in part, on a Holland parametric tropic cyclone model or a comparison of results to the predicted results from a Holland parametric tropical cyclone model. For example, the Holland Model, which may express wind speed at a given location as a function of distance from the eye, may allow buoy process 10 to calculate and compare expected wind speed at a given drone buoy location to an actual buoy location received in order to score the relevancy of the data provided by a given position. In some implementations, the second location may be determined by repeating the methodology noted above and taking into account the current position of the storm. The more repetition, the better the results may become over time generally. In some implementations, determining 308 one or more buoy placement scores may include comparing wind speed output against expected wind speed at the location of drone buoy 602 as computed from the Radius of Maximum Wind (RMW) and B values using the Holland model. The Holland model may express tropical cyclone wind speed at a given location as a function of its distance from the storm eye. The Holland model may use two parameters, an alpha and beta (b) parameter, in order to understand the shape of the wind speed curve. In some implementations, buoy process 10 may compute the distance where this wind speed is maximized—the radius of maximum winds (RMW)—which then allows expression of the a parameter in terms of RMW and $\beta$. Knowing the values of the RMW and $\beta$ parameter and the atmospheric pressure inside the eye of the storm may allow buoy process 10 to predict the wind speed that should be observed near the storm. With this modified parametrization of the Holland Model, buoy process 10 may compare the expected wind speed at a given location to the actual wind speed data reported from a buoy (e.g., drone buoy 602), thereby creating the foundation on which to create an algorithm to score and compare relevancy of buoy data by position. B value is a parameter that characterizes the distribution of wind speeds within a storm.

In some implementations, as noted above, determining 308 one or more buoy placement scores may be based upon, at least in part, a Levenberg-Marquardt least squares or damped least-squares method. For example, determining 308 one or more buoy placement scores based upon, at least in part, a Levenberg-Marquardt least squares or damped least-squares method may include producing parameters consistent with a database of Atlantic storms using the Levenberg-Marquardt least-squares.

In some implementations, as noted above, determining 308 one or more buoy placement scores may be based upon, at least in part, a Nelder-Mean simplex, downhill simplex, or polytope method. For example, determining 308 one or more buoy placement scores based upon, at least in part, a Nelder-Mean simplex model may include producing parameters consistent with a database of Atlantic storms using the Nelder-Mean simplex algorithm, wherein the Nelder-Mean simplex algorithm is configured to minimize the sum of the squares of residuals.

In some implementations, as noted above, the one or more buoy placement scores may be based upon, at least in part, the data received from drone buoy 602 at the first location. For example, the data received from drone buoy 602 at the first location may include wind speed and wind direction, wind variation (e.g., certain variations in wind speed in different directions at the same distance), solar radiation, air temperature and relative humidity, water temperature, surrounding pressure, wave height, and wave intervals. In some implementations, determining 308 one or more buoy placement scores may include comparing the data received from drone buoy 602 at the first location with expected data at the first location.

In some implementations, drone buoy 602 may receive a second GPS location (or other coordinate based location identification) based upon, at least in part, the analysis conducted by buoy process 10. Such information may, for example, upon determining 306 the second location on the body of water to send drone buoy 602, may provide instructions to transform drone buoy 602 between first configuration 604 and second configuration 900 to enable drone buoy 602 to travel to the second location (e.g., while in first configuration 604).

In some implementations, as noted above, determining 308 one or more buoy placement scores may include identifying one or more scoring clusters. For example, identifying the one or more scoring clusters may include abstracting the wind speed variation of drone buoy 602 into a "data bump," plotting the "data bump," and identifying a highest scoring cluster to use as a first arrangement around any of the aforementioned major storms.

In some implementations, buoy process 10 may determine 400, by drone buoy 602, a first location on a body of water. Buoy process 10 may receive 402 data, by drone buoy 602, at the first location. Buoy process 10 may determine 404 a second location on the body of water to send to drone buoy 602 based upon, at least in part, the data received by drone buoy 602.

For example, in some implementations, buoy process 10 may determine 400, by drone buoy 602, a first location on a body of water. For instance, rather than a remote computing device determining optimal drone buoy placement, drone buoy 602 may itself determine 400 optimal drone buoy placement for the first location around an approaching storm to provide more relevant and continuous input data to weather forecasters using a similar method as discussed above.

In some implementations, buoy process 10 may receive 402 data, by drone buoy 602, at the first location. For example, drone buoy 602 may (e.g., in second configuration 900) receive (e.g., collect) data relative to a surrounding storm from any of the one or more sensor-based instruments referenced above.

In some implementations, buoy process 10 may determine 404 a second location on the body of water to send to drone buoy 602 based upon, at least in part, the data received (collected) by drone buoy 602. For example, the second location may indicate optimal drone buoy placement for drone buoy 602 at the second location to continue providing accurate and relevant input data consistent with the storm path. More accurate data may come from drone buoy 602 being as close to the storm as possible. As such, rather than a remote computing device determining optimal drone buoy placemen for the second location after receiving the data from drone buoy 602, drone buoy 602 itself (e.g., via buoy process 10) may determine 404 such a location based upon, at least in part, the collected data.

In some implementations, determining 404 the second location may include determining 406 one or more buoy placement scores. For example, drone buoy 602 may determine 406 one or more buoy placement scores by coding a scoring system for determining optimal drone buoy placement, similarly as noted above, and using any of the above-noted techniques.

In some implementations, buoy process 10 may determine 500, by a computing device, a first location on a body of water. Buoy process 10 may receive 502, by drone buoy 602, the first location. Buoy process 10 may receive 504, at the computing device, data from drone buoy 602. Buoy process 10 may determine 506, at the computing device, a second location on the body of water to send to drone buoy 602 based upon, at least in part, the data received from drone buoy 602.

In some implementations, buoy process 10 may determine 500, by a computing device, a first location on a body of water. For instance, in some implementations, a remote computing device, rather than buoy process 10, may determine 500 an optimal drone buoy placement for drone buoy 602 at the first location to provide more relevant and continuous input data to weather forecasters, similarly as discussed above using any of the above-noted techniques.

In some implementations, buoy process 10 may receive 502, by drone buoy 602, the first location. For example, drone buoy 602 may receive 502 the first location determined by the remote computing device, which may be based upon, at least in part, the collected data by drone buoy 602 relative to a surrounding storm from any of the one or more sensor-based instruments referenced above.

In some implementations, buoy process 10 may receive 504, at the computing device (e.g., the remote computing device), data collected from drone buoy 602. For example, drone buoy 602 may send the collected data to the computing device, relative to a surrounding storm from any of the one or more sensor-based instruments referenced above.

In some implementations, buoy process 10 may determine 506, at the computing device, a second location on the body of water to send to drone buoy 602 based upon, at least in part, the data received from drone buoy 602. For example, in some implementations, rather than drone buoy 602 determining the second location itself, the remote computing device may do so based upon the collected data received from drone buoy 602, using any of the above-noted techniques, including the remote computing device (rather than drone buoy 602) determining 508 one or more buoy placement scores.

While buoy process 10 is described as a method for determining an optimal drone buoy placement, buoy process 10 may be used for other purposes, such as, for example, providing target drop locations for aircrafts configured to release other devices. For example, other devices may include a dropsonde (e.g., a weather reconnaissance device dropped from an aircraft at an altitude over water to measure storm conditions as the device falls to the surface). As such, the description of buoy process 10 determining an optimal buoy placement should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   determining, by a computing device, a first location on a body of water;
   transmitting the first location to a drone buoy;
   receiving current data from the drone buoy at the first location;
   determining a second location on the body of water to send to the drone buoy based upon, at least in part, the current data received from the drone buoy at the first location, wherein determining the second location includes determining one or more buoy placement scores based upon, at least in part, a comparison of predicted data at the first location and the current data at the first location; and
   transmitting instructions to the drone buoy to move to the second location using a propulsion system of the drone buoy.

2. The computer-implemented method according to claim 1 wherein determining the one or more buoy placement scores is based upon, at least in part, a Levenberg-Marquardt least squares or damped least-squares method.

3. The computer-implemented method according to claim 1 wherein determining the one or more buoy placement scores is based upon, at least in part, a Nelder-Mean simplex, downhill simplex, or polytope method.

4. The computer-implemented method according to claim 1 wherein determining the one or more buoy placement scores is based upon, at least in part, a Holland parametric tropic cyclone model.

5. The computer-implemented method according to claim 1 wherein the current data includes wind speed variation.

6. The computer-implemented method according to claim 1 wherein determining the one or more buoy placement scores includes identifying one or more scoring clusters.

7. A computer-implemented method comprising:
   determining, by a drone buoy, a first location on a body of water;
   receiving current data, by the drone buoy, at the first location;
   determining a second location on the body of water to send to the drone buoy based upon, at least in part, the current data received by the drone buoy at the first location, wherein determining the second location includes determining one or more buoy placement scores based upon, at least in part, a comparison of predicted data at the first location and the current data at the first location; and
   executing instructions by the drone buoy to send the drone buoy to the second location using a propulsion system of the drone buoy.

8. The computer-implemented method according to claim 7 wherein determining the one or more buoy placement scores is based upon, at least in part, a Levenberg-Marquardt least squares or damped least-squares method.

9. The computer-implemented method according to claim 7 wherein determining the one or more buoy placement scores is based upon, at least in part, a Nelder-Mean simplex downhill simplex, or polytope method.

10. The computer-implemented method according to claim 7 wherein determining the one or more buoy placement scores is based upon, at least in part, a Holland parametric tropic cyclone model.

11. The computer-implemented method according to claim 7 wherein the current data includes wind speed variation.

12. The computer-implemented method according to claim 7 wherein determining the one or more buoy placement scores includes identifying one or more scoring clusters.

13. A computer-implemented method comprising:
    determining, by a computing device, a first location on a body of water;
    receiving, by a drone buoy, the first location;
    receiving, at the computing device, current data from the drone buoy at the first location;
    determining, at the computing device, a second location on the body of water to send to the drone buoy based upon, at least in part, the current data received from the drone buoy, wherein determining the second location includes determining one or more buoy placement scores based upon, at least in part, a comparison of predicted data at the first location and the current data at the first location;

transmitting the second location to the drone buoy; and executing instructions by the drone buoy to send the drone buoy to the second location using a propulsion system of the drone buoy.

14. The computer-implemented method according to claim 13 wherein determining the one or more buoy placement scores is based upon, at least in part, a Levenberg-Marquardt least squares or damped least-squares method.

15. The computer-implemented method according to claim 13 wherein determining the one or more buoy placement scores is based upon, at least in part, a Nelder-Mean simplex downhill simplex, or polytope method.

16. The computer-implemented method according to claim 13 wherein determining the one or more buoy placement scores is based upon, at least in part, a Holland parametric tropic cyclone model.

17. The computer-implemented method according to claim 13 wherein the current data includes wind speed variation.

18. The computer-implemented method according to claim 13 wherein determining the one or more buoy placement scores includes identifying one or more scoring clusters.

* * * * *